UNITED STATES PATENT OFFICE.

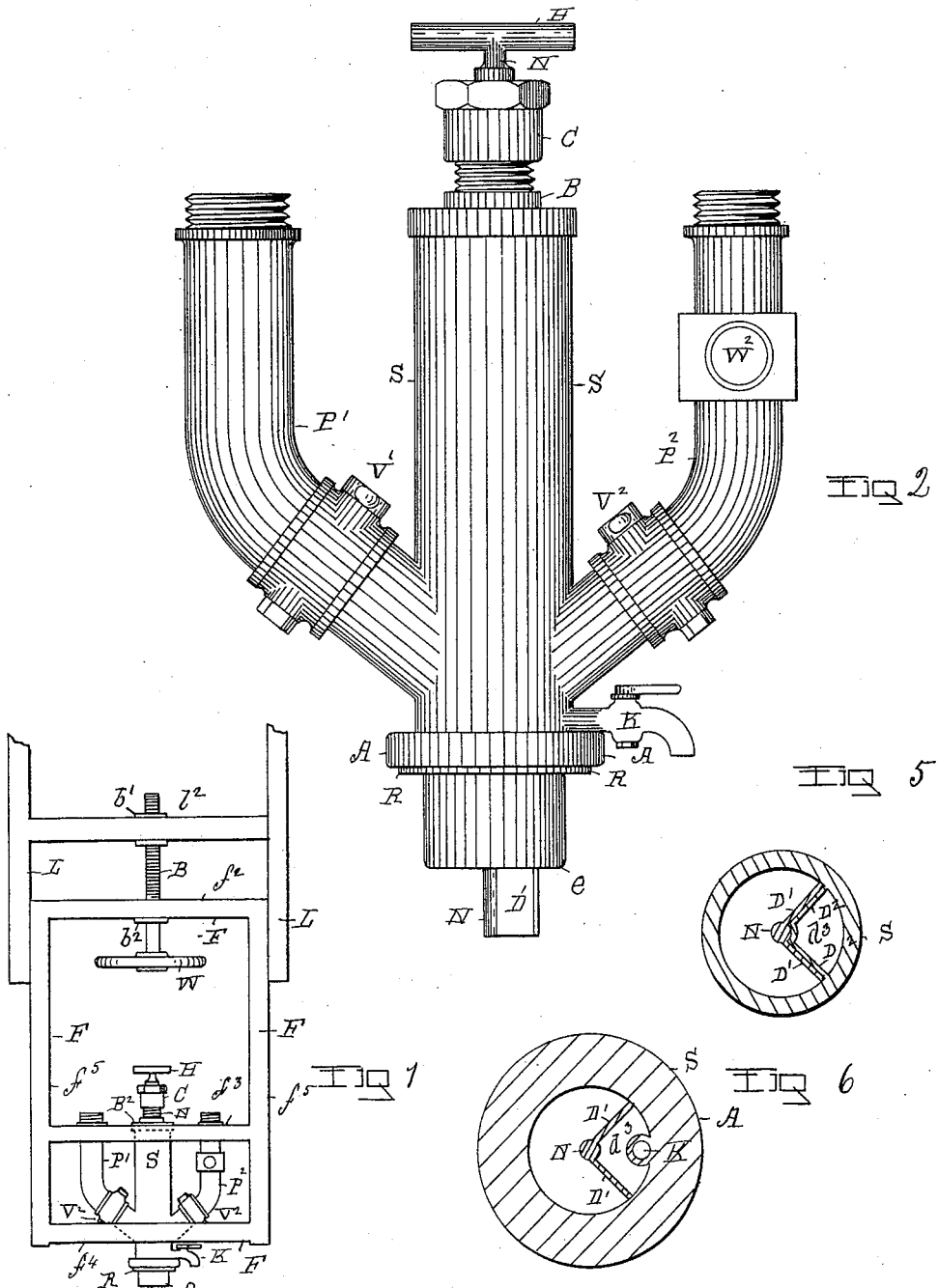

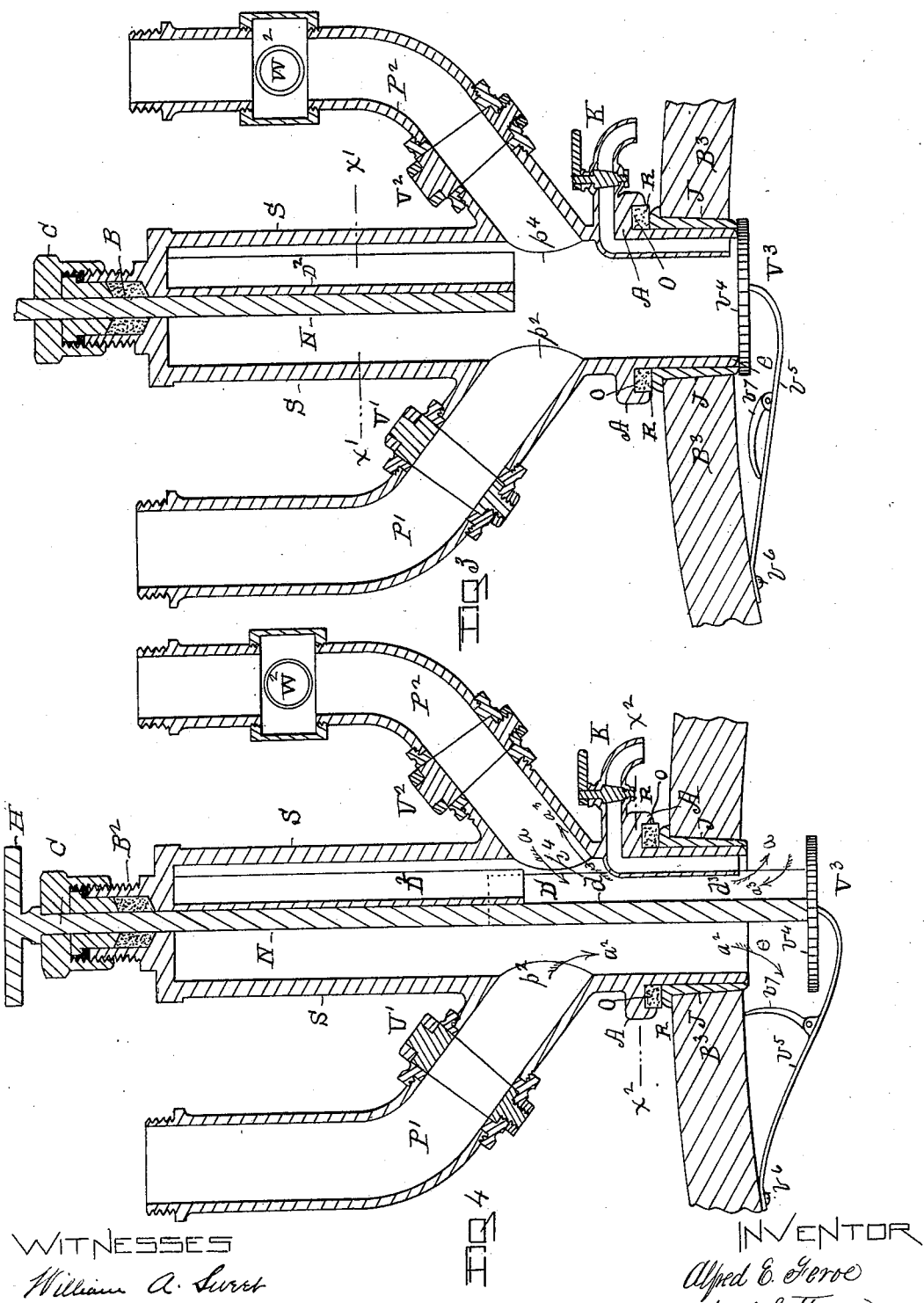

ALFRED E. FEROE, OF MADALIN, NEW YORK, ASSIGNOR TO FEROE BROTHERS & CONWAY, OF TROY, NEW YORK.

RACKING APPARATUS FOR BARRELING BEER.

SPECIFICATION forming part of Letters Patent No. 566,898, dated September 1, 1896.

Application filed January 16, 1896. Serial No. 575,671. (No model.)

*To all whom it may concern:*

Be it known that I, ALFRED E. FEROE, of Madalin, Tivoli village, county of Dutchess, and State of New York, have invented a new and useful Improvement in Racking Apparatus for Barreling Beer, of which the following is a specification.

My invention relates to what is termed "racking apparatus" used for barreling beer or fermented liquors under pressure; and my improvements upon this class of devices relate to a method of constructing them by which the air or gas escaping from the barrel as replaced by the entering beer or liquor will be conducted from the barrel, so as not to interfere with or impinge upon the entering beer or liquor.

Accompanying this specification, to form a part of it, there are two plates of drawings containing six figures illustrating the application of my invention, with the same designation of parts by letter-reference used in all of them.

Of the illustrations, Figure 1 shows in side elevation my improved racking apparatus, together with the frame to which it is connected and by which it is operated to engage with the bung-hole of a barrel. Fig. 2 is a side elevation of my racking apparatus shown as detached from the frame operating it and illustrated as larger in size than shown at Fig. 1. Fig. 3 is a central vertical section of the racking apparatus detached from the frame operating it, with the apparatus illustrated at Fig. 2 shown as connected to the bung-bushing of a barrel, with the bung-valve closed. Fig. 4 is another central vertical section of the apparatus shown at Fig. 2 and with bung-hole valve shown as opened and the racking apparatus in a position to deliver beer or liquor to the barrel, with the spring bung-valve shown as opened by the rod in the stand-pipe and with the passage for the air or gas escape from the barrel shown as open. Fig. 5 is a cross-section taken on the line $x'\ x'$ of Fig. 3, and Fig. 6 is a section taken on the line $x^2\ x^2$ of Fig. 4.

The letter F designates a frame having the top cross-bar $f^2$, the middle cross-bar $f^3$, and the bottom cross-bar $f^4$, with the sides $f^5$ of the frame F arranged to be moved upwardly and downwardly in slideways formed on the interior face of the depending legs L L, which are provided with a stationary cross-bar $l^2$.

The racking apparatus is connected to the cross-bars $f^3$ and $f^4$ of the frame F.

The letter B designates a bar which at its lower end is provided with a hand-wheel W, and this bar B is threaded into the block $b'$ on the stationary bar $l^2$ and also into the block $b^2$ of cross-bar $f^2$, and by which wheel, when turned as thus constructed, the frame F and the attached racking apparatus are moved downwardly, so that the end $e$ of the latter will enter the bung-hole of a barrel, as shown at Figs. 3 and 4.

The letter S designates a stand-pipe which is provided at its upper end with a stuffing-box $B^2$ and a cap C. The letter P' designates a pipe connecting with the interior of the stand-pipe S by means of the port $p^2$, and this pipe connects with a tank, (not shown,) from which beer under pressure is supplied to said stand-pipe.

The letter V' designates a valve on the pipe P', and the letter $P^2$ designates another pipe which, by means of a port $p^4$, connects with the interior of the stand-pipe S, and this pipe is provided with a valve $V^2$, and it connects with the gas or air space of the tank from which beer or liquor is supplied to the pipe P', which tank and connection are not shown. The letter $W^2$ designates a window formed in the pipe $P^2$, by which when a cask or barrel is filled the level of the liquid may be seen.

The letter A designates a flange formed on the lower end of the stand-pipe S, and O an annular recess formed in the under surface of said flange, and the letter R designates a packing-ring of rubber arranged in said annular recess, which when the apparatus is forced downwardly to have the lower end $e$ of the stand-pipe enter a bung-hole or bung-hole bushing this ring R will form an air-tight connection between the apparatus and the barrel.

The letter N designates a rod adapted to pass down through the stuffing-box $B^2$ and the cap C into and through the stand-pipe S, and when forced downwardly far enough to engage with and open the valve $V^3$.

The letter D' designates a vertical partition, which is angular in cross-section, as shown at Fig. 6, with its edges engaging with the interior of the stand-pipe, and at its angular apex this partition connects with the rod N, so as to move upwardly and downwardly with the latter. The letter $D^2$ designates another angular partition, which is also angular in cross-section, as shown at Fig. 5, and this partition $D^2$ is a stationary one, along over which exteriorly the partition $D'$ slides when moved downwardly in connection with the rod N. When the rod N is moved upwardly to the extent of its movement in that direction, the lower ends of the partitions $D'$ and $D^2$ are coincidently parallel, as shown at Fig. 3. When the rod N is, in connection with the partition $D'$, moved downwardly to the limit of its movement in that direction, its upper end will lap past the lower end of the stationary partition, as is shown at Fig. 4, and thus inclose within the stand-pipe S the passage-way $d^3$, leading up from the barrel interior to connect with the pipe $P^2$.

The letter K designates a cock, by which beer or liquor remaining in the apparatus above the bung-hole may be drawn off after the bung-hole valve $V^3$ is closed.

The bung-hole valve $V^3$ consists of a valve disk or gate $v^4$, attached to the free end of a spring $v^5$, which latter at its end $v^6$ is attached to the interior of the barrel. The letter $v^7$ designates a finger-form detent, which at its lower end is pivotally connected to the spring $v^5$, and on which pivoted connection it can be turned up to engage with the barrel to thus hold the valve open when it becomes necessary to rinse or wash the barrel interior.

The operation of the apparatus thus illustrated and described is as follows: With the valve $V'$ on the pipe $P'$ closed and the valve $V^2$ on the pipe $P^2$ also closed, the apparatus is moved downwardly by the hand-wheel W until the lower end $e$ of the stand-pipe has entered the bung-hole or bung-hole bushing J and with sufficient pressure to have the ring R make an air-tight connection with the barrel placed immediately beneath the apparatus. This having been done, the rod N, by means of its handle H, is moved downwardly in the stand-pipe S until it and its partition $D'$ have entered the bung-hole of the barrel $B^3$ and forced open the valve $V^3$, with the parts appearing as shown at Fig. 4. The valve $V^2$ on the pipe $P^2$ is now opened and pressure applied to the barrel interior, the gas or air producing it entering through the pipe $P^2$ and the chamber $d^3$, the course of the entering air or gas being indicated by the arrow $a$. When the pressure upon the barrel equals that upon the tank from which the gas comes to create the pressure within the barrel, then the valve $V'$ on the pipe $P'$ is opened, and beer or liquor will pass through the pipe $P'$ to the stand-pipe S to enter the barrel under the force of gravity, the course of the entering beer or liquor being indicated by the direction-arrow $a^2$, and the air displaced in the cask by the entering beer will pass up through the chamber $d^3$ into the pipe $P^2$ to return to the tank from which the beer is supplied, the course of the escaping air being indicated by the direction-arrow $a^3$. When the barrel is filled, as may be determined through the observation-window $W^2$, the rod N is raised and the valves $V'$ and $V^2$ are closed. The beer remaining in the apparatus is drawn off through the cock K, the bung-valve $V^3$ having closed automatically. After this has been done a bung is driven into the bung-hole or bung-hole bushing above the bung-hole valve $V^3$.

As thus constructed and arranged to be operated, casks or barrels may be filled under pressure and without having the current of the entering beer impinge upon the current of air or gas escaping from the barrel and thus render the action irregular and in a measure uncertain.

Having thus described my invention, what I claim, and desire to secure by Letters Patent, is—

1. In an apparatus for barreling beer or fermented liquors under pressure the combination with the stand-pipe S, having the stuffing-box $B^2$, cap C, stationary partition $D^2$, and provided with the packing-ring R, of the rod N, having the connected vertical partition $D'$; the branch pipe $P'$, provided with the valve $V'$, and the branch pipe $P^2$, having the valve $v^2$, constructed and arranged to be operated substantially in the manner as and for the purposes set forth.

2. The combination with the valve $V^3$, arranged upon the under side of a barrel bung-hole or bung-hole bushing; of the stand-pipe S, having the stuffing-box $B^2$, and cap C, stationary partition $D^2$, and having the packing-ring R; of the rod N, provided with the connected vertical partition $D'$; the pipe $P'$ connecting with said stand-pipe, and provided with the valve $V'$, the pipe $P^2$ connecting with said stand-pipe, and provided with the valve $V^2$, and the window $W^2$, constructed and arranged to be operated substantially in the manner as and for the purposes set forth.

3. In a valve for automatically closing the bung-hole of barrels the combination with a disk or gate $v^4$, of the spring $v^5$, which at one of its ends is attached to said disk, and at its other end to the barrel; and the finger-form detent $v^7$, which at one of its ends connects pivotally with said spring whereby it may be raised to engage with the under side of the barrel to hold said valve open substantially in the manner shown and described.

Signed at Troy, New York, this 10th day of January, 1896, in the presence of the two witnesses whose names are hereto written.

ALFRED E. FEROE.

Witnesses:
W. E. HAGAN,
CHARLES S. BRINTNALL.